United States Patent
Mansar et al.

(10) Patent No.: US 11,232,141 B2
(45) Date of Patent: Jan. 25, 2022

(54) METHOD AND DEVICE FOR PROCESSING AN ELECTRONIC DOCUMENT

(71) Applicant: FORTIA FINANCIAL SOLUTIONS, Paris (FR)

(72) Inventors: Youness Mansar, La Garenne-Colombes (FR); Sira Ferradans, Paris (FR); Jacopo Staiano, Paris (FR)

(*) Notice: Subject to any disclaimer, the term of this patent is extended or adjusted under 35 U.S.C. 154(b) by 547 days.

(21) Appl. No.: 16/129,903

(22) Filed: Sep. 13, 2018

(65) Prior Publication Data

US 2019/0188277 A1   Jun. 20, 2019

(30) Foreign Application Priority Data

Dec. 18, 2017 (EP) .................................. 17306801

(51) Int. Cl.
*G06F 16/33* (2019.01)
*G06N 3/08* (2006.01)
(Continued)

(52) U.S. Cl.
CPC ........ *G06F 16/3347* (2019.01); *G06F 16/353* (2019.01); *G06F 40/279* (2020.01); *G06F 40/284* (2020.01); *G06F 40/30* (2020.01); *G06K 9/6247* (2013.01); *G06N 3/08* (2013.01); *G06N 5/003* (2013.01)

(58) Field of Classification Search
CPC .... G06F 16/3347; G06F 16/353; G06F 40/30; G06F 40/284; G06F 40/279; G06N 5/003; G06N 3/08; G06K 9/627
See application file for complete search history.

(56) References Cited

U.S. PATENT DOCUMENTS

| 8,504,361 B2* | 8/2013 | Collobert | G06F 40/284 704/232 |
| 10,705,796 B1* | 7/2020 | Doyle | G06F 40/20 704/9 |

(Continued)

FOREIGN PATENT DOCUMENTS

CN   107291795 A   10/2017

OTHER PUBLICATIONS

Friedman, J., Hastie. T., & Tibshirani, R. The elements of statistical learning Springer, second edition, 2008, Ch. 12.

(Continued)

*Primary Examiner* — Ken Hoang
(74) *Attorney, Agent, or Firm* — Yasser Mourtada; Robert Facey; William Salinger

(57) ABSTRACT

A method for processing an electronic document comprising text is disclosed. The method comprises: splitting the text into at least one sentence, and for each said sentence: associating each word of the sentence with a word-vector; representing the sentence by a sentence-vector, wherein obtaining the sentence-vector comprises computing a weighted average of all word-vectors associated with the sentence; if it is determined that the sentence-vector is associated with a tag in a data set of sentence-vectors associated with tags, obtaining the tag from the database; otherwise, obtaining a tag for the sentence-vector using a classification algorithm; processing the sentence if the tag obtained for the sentence is associated with a predetermined label.

19 Claims, 2 Drawing Sheets

(51) Int. Cl.
  *G06F 16/35*     (2019.01)
  *G06N 5/00*      (2006.01)
  *G06K 9/62*      (2006.01)
  *G06F 40/30*     (2020.01)
  *G06F 40/279*    (2020.01)
  *G06F 40/284*    (2020.01)

(56) References Cited

U.S. PATENT DOCUMENTS

2011/0093414 A1* 4/2011 Xu .................. G06F 40/20
                                              706/12
2016/0350655 A1* 12/2016 Weiss ............... G06F 40/35
2017/0293725 A1* 10/2017 Liu ............... G06F 16/24522
2017/0308790 A1  10/2017 Nogueira dos Santos et al.

OTHER PUBLICATIONS

Goodfellow Ian, Yoshua Bengio, and Aaron Courville Deep learning MIT press, 2016, Ch.9.

Youness Mansar et al "Fortia-FBK at SemEval-2017 Task 5: Bullish or Bearish, Inferring Sentiment towards Brands from Financial News Headlines" arxiv.org. Cornell University Ithaca, NY 14853 Apr. 4, 2017 (Apr. 4, 2017), XP 080760585.

T. Mikolov, K. Chen, G. Corrado, and J.Dean "Efficient estimation of word representations in vector space," arXiv preprint arXiv: 1301.3781, 2013.

J. Pennington, R. Socher, and C.D. Manning "GloVe: Global vectors for word representation.," Proceedings of EMNLP 2014, vol. 14, pp. 1532-1543, 2014.

Jacopo Staiano et al: "DepecheMood: a Lexicon for Emotion Analysis from Crowd-Annotated News", Proceedings of the 52nd Annual Meeting of the Association for Computational Linguistics (Short Papers), May 7, 2014 (May 7, 2014), pp. 427-433, XP055483290.

G. Strang, "Introduction to Linear Algebra", Ch. 7.3 Principal Component Analysis. 5th Edition, MIT Press, May 2016.

Yoon Kim Convolutional Neural Networks for Sentence Classification arXiv preprint arXiv:1408.5882, 2014.

Yoon Kim "Instantly share code, notes, and snippets. Convolutional Neural Network for Sentence Classification Introduction", 2016, XP055483311.

English Language Translation of CN 107291795A.

* cited by examiner

METHOD AND DEVICE FOR PROCESSING AN ELECTRONIC DOCUMENT

CROSS-REFERENCE TO RELATED APPLICATIONS

This present application claims priority to European Patent Application No. 17 306 801.6, filed on Dec. 18, 2017; which is incorporated herein by reference in its entirety.

FIELD

The present disclosure relates to improving the performance of methods of processing electronic text documents for identifying therein or extracting therefrom sentences that correspond to a given criteria.

BACKGROUND

Sentence classification methods allow a user to identify systematically and rapidly sentences that meet a predetermined rule. They may be used in any field, and are of particular importance when such identification may be performed very rapidly and/or in a very long text.

A sentence classification method is proposed by Kim (Yoon Kim, "Convolutional Neural Networks for Sentence Classification". arXiv preprint arXiv:1408.5882, 2014). This method merely consists in representing a sentence as a concatenation of word embeddings, where each word is represented as a column in the matrix. The matrix is input to a Convolutional Neural Network (CNN) classifier.

It is recalled that a CNN is a neural network where each layer has a set of convolutional filters. The values of these filters are optimized during a training phase. This training phase includes obtaining the values of the filters that give best accuracy for the classification task on a predefined data set. This classifier algorithm takes as input a vector or matrix and provides as output a binary tag whose value represents whether a sentence is considered to belong to a predefined class or not.

However, the accuracy of Kim's method is not enough for industrial applications.

SUMMARY

According to a first aspect, the present disclosure relates to a method of processing an electronic document comprising text. This method comprises a step of splitting the text into sentences, and for each sentence: associating each word of the sentence with a word-vector; representing the sentence by a sentence-vector, wherein obtaining the sentence-vector comprises computing a weighted average of all the word-vectors of the sentence; if it is determined that the sentence-vector is associated with a tag in a data set of sentence-vectors associated with tags, obtaining the tag from the data set; otherwise, obtaining a tag for the sentence-vector using a classification algorithm; and processing the sentence if the tag obtained for the sentence is associated with a predetermined label.

As described further below, embodiments improve the accuracy of sentence classification, in comparison with Kim's method mentioned above. This result is notably achieved by the combination of representing the sentence by a sentence-vector and associating the sentence-vector with a tag present in the data set if applicable.

Associating a word with a word-vector ("word embeddings") includes creating a dictionary of words, and for each of these words, associating a unique vector.

In one embodiment, associating a word to a word-vector uses a weighted least squares model that trains on global word-word co-occurrence counts. An example method which may be used is described in Pennington (J. Pennington, R. Socher, and C. D. Manning, "GloVe: Global vectors for word representation," in Proceedings of EMNLP 2014, vol. 14, pp. 1532-43, 2014).

In one embodiment, associating a word to a word-vector uses a two layer neural network trained on the task of predicting the word given the context. An example method which may be used is described in Mikolov (T. Mikolov, K. Chen, G. Corrado, and J. Dean, "Efficient estimation of word representations in vector space," arXiv preprint arXiv: 1301.3781, 2013).

These two methods advantageously encode semantic meaning and locate close together word-vectors corresponding to similar concepts.

In one embodiment, the method further comprises a preprocessing step, which includes replacing capital letters by lower case letters in each sentence; and deleting predetermined characters in each sentence.

In one embodiment, associating a word-vector with a word comprises: obtaining the word-vector associated with said word in a database, if the word is already associated with a word-vector in the database; or generating the word-vector with random values if the word is not already associated with a word-vector in the database.

In one embodiment, the weight given to a word-vector is all the more important as the probability of finding the word associated to the word-vector in the text is low.

In one embodiment, the weight $w_i$ given to a word-vector $u_i$ is given by:

$$w_i = a/(a+p(u_i))$$

where a is a number, and p(ui) is the probability of finding the word i associated to the word-vector ui in the text.

In another embodiment, the above-mentioned weight may be the term frequency-inverse document frequency "tf-idf" disclosed at https://fr.wikipedia.org/wiki/TF-IDF, this term being calculated as the product of the frequency of the word and a measure of how much information the word provides.

In one embodiment, determining whether a sentence-vector is associated with a tag in the data set of sentence-vectors associated with tags includes searching said sentence-vectors in the data set, wherein this searching implements: an exhaustive search; a multidimensional binary search tree that organizes the space of sentence-vectors by implicitly splitting it using half-hyperplanes; or a branch and bound algorithm for finding k-nearest neighbours.

Examples of multidimensional binary search trees and of branch and bound algorithm are respectively detailed in Bentley (Bentley, J. L. Multidimensional binary search trees used for associative searching. Communications of the ACM, 18(9), 509-517) and Fukunaga (K. Fukunaga and P. M. Narendra. A Branch and Bound Algorithm for Computing K-Nearest Neighbors. IEEE Trans. Computers, C-24(7): 750-753, 1975).

In one embodiment, the sentence-vector is normalized. This post-processing makes the sentence representation more discriminative.

In one embodiment, normalizing the sentence-vector comprises projecting the sentence-vector on a precomputed sentence-vector C and subtracting the result of this projection from the sentence-vector.

In one embodiment, the precomputed sentence-vector C is computed as the first component of a Principal Component Analysis. An example method for Principal Component Analysis is described in Strang (G. Strang. Introduction to Linear Algebra, Chp 7.3 Principal Component Analysis. 5th Edition, MIT Press, May 2016).

In one embodiment, if it is determined that the sentence-vector is not associated with a tag in the data set, obtaining the sentence-vector using a classification algorithm comprises: obtaining a matrix where each column with index 'i' contains the word-vector associated with the i-th word in the sentence; determining a tag for the sentence using this matrix and a pre-trained classification method; and storing this tag in association with the sentence-vector in the data set.

In one embodiment, the pre-trained classification method is chosen among: a sentence classification method comprising a representing said sentence as a concatenation of word embeddings, where each word is represented as a column in the matrix, and inputting the matrix into a Convolutional Neural Network classifier, for example the sentence classification method proposed by Kim mentioned above; or a supervised classification method. The SVM method and the CNN method disclosed in Friedman (Friedman, 1, Hastie, T., & Tibshirani, R. The elements of statistical learning. New York: Springer series in statistics. Second edition, 2008) and Goodfellow (Goodfellow, Ian, Yoshua Bengio, and Aaron Courville. *Deep learning*. Chp 9. MIT press, 2016) respectively, are examples of such supervised classification method.

In one embodiment, the method comprises: presenting to the user the sentence and the tag obtained for the sentence-vector representing the sentence; and enabling the user to correct the tag in the data set.

Thus, embodiments allow the user to react in a real-time for correcting a tag if the user considers that the classification of the sentence is not correct. Therefore, the method can improve as it processes more sentences and can improve in real time the response.

In a particular implementation, the various processes of the document processing method are provided by program instructions for computers or microprocessors.

Consequently, some embodiments also provide a computer or microprocessor program on a non-transitory data medium, the program being suitable for being performed in a computer, the program including instructions adapted to perform the processes of the document processing method as described above.

Some embodiments also provide a computer or microprocessor program on a data medium, the program being suitable for being performed in a connected object or more generally in a computer, the program including instructions for performing processes of a document processing method as described above.

This program may make use of any programming language, and may be in the form of source code, object code, or code intermediate between source code and object code, such as in a partially complied form, or in any other desirable form.

Some embodiments also provide a non-transitory computer readable data medium including computer program instructions as mentioned above.

The data medium may be any entity or device capable of storing the program. For example, the medium may comprise storage components, such as a read only memory (ROM), e.g. a compact disk (CD) ROM or a microelectronic circuit ROM, or indeed magnetic recording components, e.g. a floppy disk or a hard disk.

DETAILED DESCRIPTION

Figure 1A:
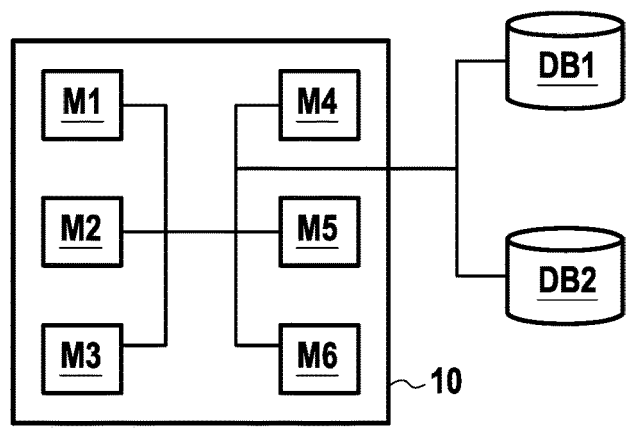
FIGS. 1A and 1B represent respectively a device for processing an electronic document according to an embodiment of the and the architecture thereof.

FIG. 1A represents a device 10 for processing an electronic document according to an embodiment.

Device 10 is configured to access: a database DB1 comprising words, each word i being associated with a word-vector $u_i$ in the database DB1; a data set DB2 comprising sentence-vectors $s_1, s_2, \ldots, s_N$ associated with tags $t_1, t_2, \ldots, t_N$.

Figure 1B:
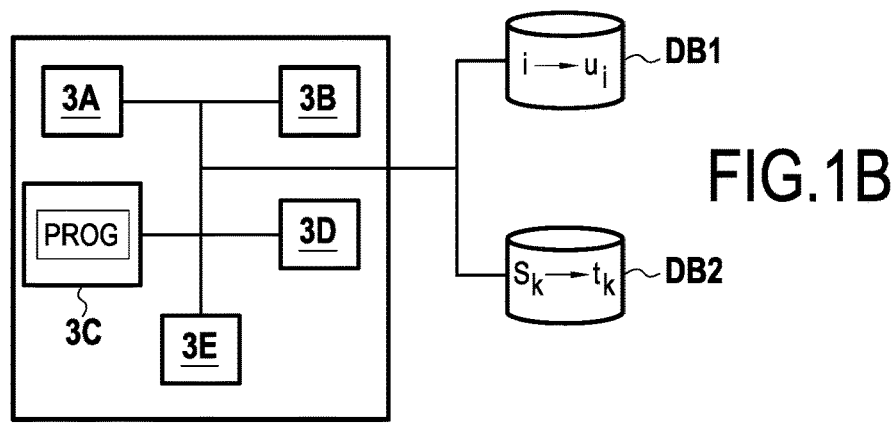

In an embodiment, the device 10 has the hardware architecture of a computer, as shown diagrammatically in FIG. 1B. In an embodiment, the device 10 includes: a processor 3A; a random access memory (RAM) 3B; a read only memory (ROM) 3C; and a rewritable non-volatile memory 3D. Furthermore, the terminal 3 is provided with input/output components 3E enabling it to interact with a user U of the terminal, such as for example a screen, a keypad.

The ROM 3C of the terminal constitutes a data medium as described herein that is readable by the processor 3A and that stores a computer program PROG including instructions for executing processes of a transfer method as described herein. In equivalent manner, the computer program defines software modules M1-M6 that when executed by processor 3A cause processor 3A to perform a method comprising: a splitting a text into sentences; associating each word of the sentence with a word-vector; representing the sentence by a sentence-vector, the sentence-vector being obtained by computing a weighted average of all the word-vectors of the sentence; determining if the sentence-vector is associated with a tag in a data set of sentence-vectors associated with tags and for obtaining this tag from the data set; obtaining a tag for the sentence-vector using a classification algorithm; and processing the sentence if the tag obtained for the sentence is associated with a predetermined label.

Figure 2:
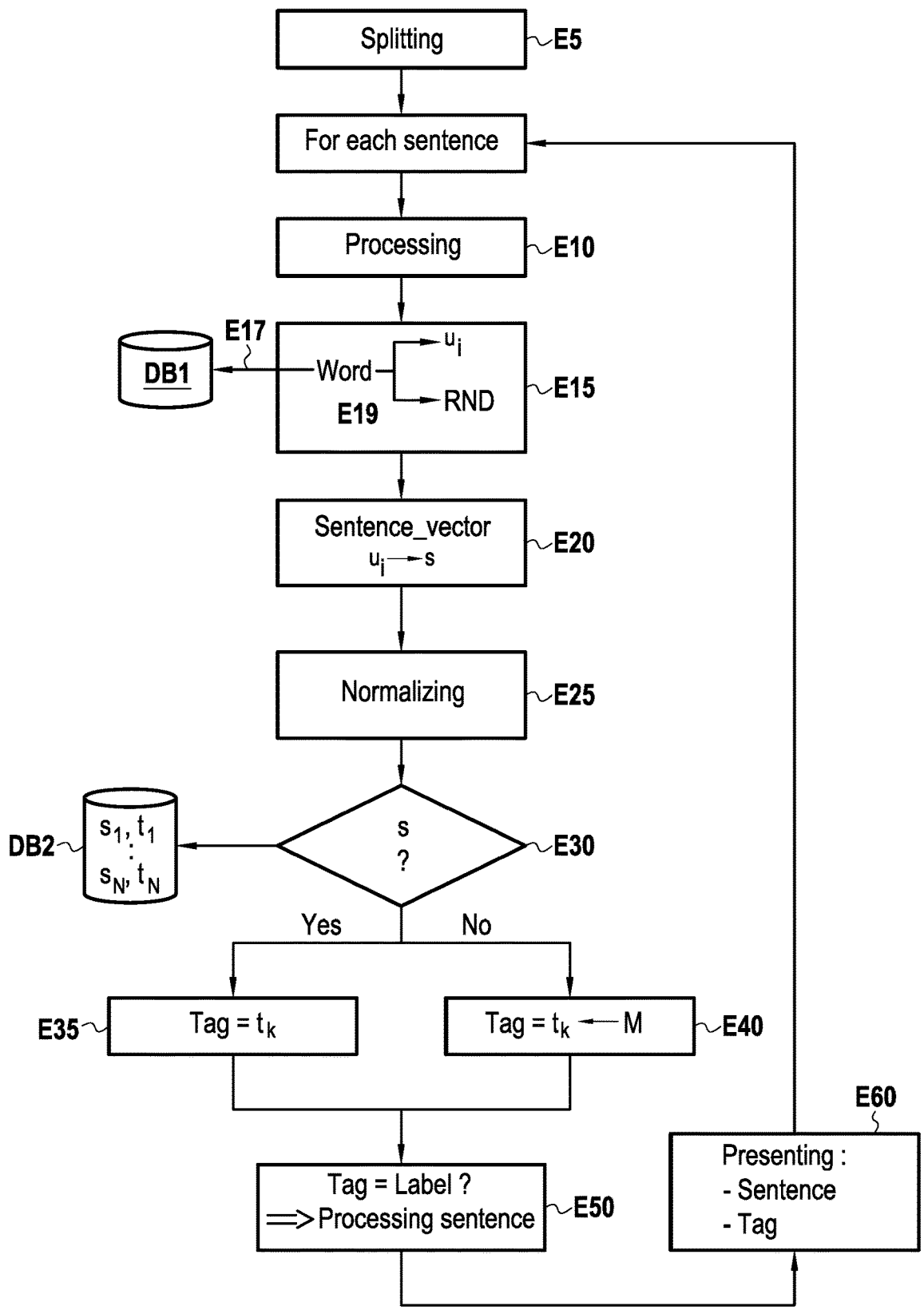
FIG. 2 is a flowchart illustrating a method of processing an electronic document according to an embodiment.

FIG. 2 is a flowchart representing the main steps E5-E60 of a method that can be executed by the device 10 in an embodiment.

The method comprises a step E5 of splitting the text into sentences.

In an embodiment, the splitting step E5 is followed by a loop of steps E10 to E60 for processing each sentence, hereafter referred to a "current sentence".

In an embodiment, the loop comprises a preprocessing step E10, for replacing capital letters by lower case letters and deleting predetermined characters (punctuation signs, URLs, percentages) in the current sentence. An example of algorithm for implementing this preprocessing step is given in Annex 1.

The preprocessing step E10 is followed by a step E15 of associating each word i of the current sentence with a word-vector $u_i$. Such a step may also be qualified as a word embedding step.

This word embedding step may be implemented using: a weighted least squares model that trains on global word-word co-occurrence counts; or a two layer neural network trained on the task of predicting the word given the context.

In an embodiment, step E15 comprises a step E17 of determining whether word i is already associated with a word-vector $u_i$ in the database DB1. In such a case the word0vector $u_i$ is obtained from the database DB1.

Otherwise, the word vector $u_i$ associated to word i is generated with random values during a step E19. Word i and the generated word vector are stored in the database DB1 so that in further occurrences this word will be associated to the same word-vector.

The word embedding step E15 is followed by a step E20 of representing the current sentence by a sentence-vector s computed as a weighted average of the word-vectors $u_i$ of the current sentence:

$$s = w_1 u_1 + w_2 u_2 + \ldots$$

The sentence vector s and the word vectors $u_i$ have the same dimensions.

In an embodiment, the weight $w_i$ given to a word-vector $u_i$ is all the more important as the probability of finding the word i associated to this word-vector $u_i$ in the text is low. For example, the weight $w_i$ may be inverse to the frequency of appearance of the word i in the text.

In this embodiment, the weight $w_i$ given to a word-vector $u_i$ is given by:

$$w_i = a/(a + p(u_i))$$

where a is a number, and $p(u_i)$ is the probability of finding the word i in the text.

In an embodiment, the step E20 of calculating the sentence-vector s is followed by a step E25 of normalizing said sentence vector s.

In a particular embodiment, the normalizing step E25 comprises: projecting the sentence-vector s on a precomputed sentence-vector C; subtracting the result of said projection from the sentence-vector s; and dividing the vector by its length. For example, the following equations may be used:

$$s_{temp} = s$$

$$s' = s_{temp} - \langle s_{temp}, C \rangle C$$

$$s = s'/|s'|$$

where $s_{temp}$ is a temporary variable used to store the value of the sentence-vector before normalization; s is the sentence-vector after normalization; the | | operator represents the norm of the vector; the <,> operator represents the dot product; and C is the first component of the Principal Component Analysis (PCA) of a predefined set of sentences vectors.

The PCA method includes fitting an ellipsoid to the training set. The axes of this ellipsoid are the principal components. Vector 'C' corresponds to the biggest principal component.

In an embodiment, the normalizing step E25 is followed by a step E30 of determining if the sentence-vector s (normalized or not) is associated with a tag in a data set of sentence-vectors $s_1, s_2, \ldots, s_N$ associated with tags $t_1, t_2, \ldots, t_N$ and memorized in the data set DB2.

In an embodiment, step E30 includes determining the Euclidian distance between the sentence-vector s and the sentence-vectors $s_1, \ldots, s_N$. If the Euclidian distance between s and a sentence-vector $s_k$ is less than a predetermined threshold, it is considered that the sentence vector s is the same or similar to the sentence-vector $s_k$ and the tag $t_k$ associated with the sentence-vector $s_k$ in the data set DB2 is obtained during a step E35.

Otherwise, if it is determined at step E30 that the sentence-vector s is not in the above-mentioned data set, a tag $t_s$ is obtained for the sentence-vector s using a classification algorithm during a step E40.

In an embodiment, the determining step E30 requires searching all the sentence-vectors $s_1, \ldots, s_N$ in the data set DB2.

This search may be performed using: an exhaustive search; a multidimensional binary search trees used for associative searching, for example the kd-tree algorithm disclosed in Bentley mentioned above; or a branch and bound algorithm, for example the ball-tree algorithm disclosed in Fukunaga mentioned above.

The two latter algorithms are more efficient than the exhaustive search which is complex and exponential by nature. They both organize the search space so that some comparisons can be discarded without actually computing the distance between the sentence-vectors.

In an embodiment, if it is determined at step E30 that the sentence-vector s is not in the above-mentioned data set, the step (E40) for obtaining the tag $t_s$ for the sentence-vector s comprises: obtaining a matrix M where each column with index 'i' contains the word-vector associated with the i-th word in the current sentence; determining the tag $t_s$ for the sentence-vector s using said matrix and a pretrained classification method; and storing the tag $t_s$ in association with the sentence-vector s in the data set DB2.

The pretrained classification method may be the sentence classification method proposed by Kim; or any other supervised classification method, for example the SVM method or the CNN method.

Once a tag $t_s$ has been obtained for the sentence-vector s at step E35 or E40, the text processing method executes a step E50 of processing the sentence if the tag obtained for the sentence is associated with a predetermined label. This step may include highlighting the sentence in the text if the sentence matches a predetermined rule.

In an embodiment, the method also comprises a step E60 of presenting to the user the current sentence; and the tag $t_s$ identified for the sentence-vector representing this sentence.

The step E60 allows the user to correct, in the data set DB2, the tag associated with the sentence-vector s.

Figure 3:
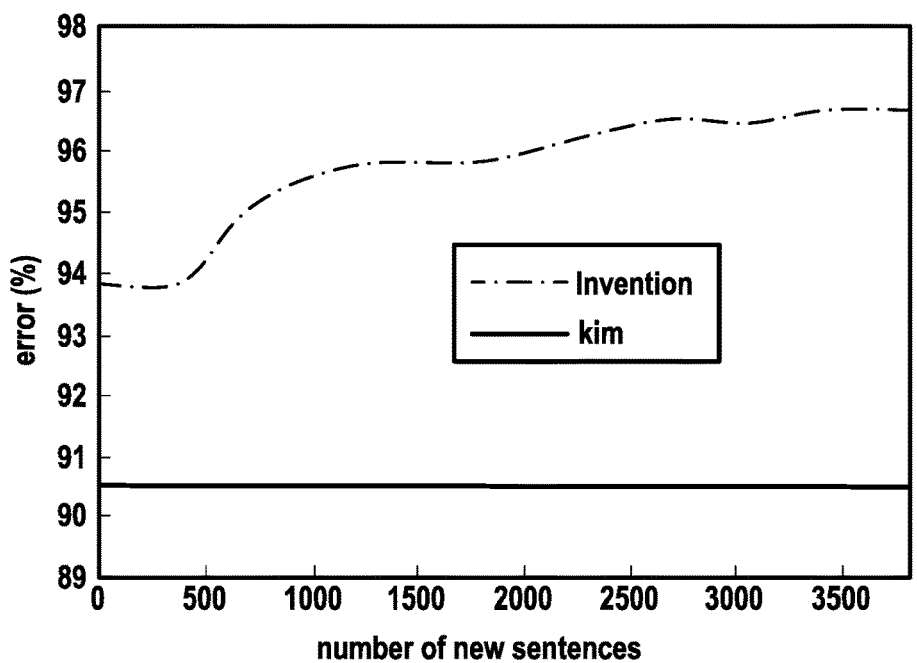
FIG. 3 is an example that illustrates the performance of a method of the present disclosure.

FIG. 3 is an example that illustrates the performance of a method of the present disclosure (dotted lines) in comparison with the method of Kim (plain lines). A testing data base of 3830 sentences with their associated tags was used. An accuracy level in the tag prediction of 93.8% was obtained using the method of the present disclosure compared to 90.51% using Kim's method.

FIG. 3 also illustrates how the accuracy changes as the method processes more sentences. The starting accuracy, as stated before was 93.8%, and after processing the testing data set, it reached 96.71% accuracy, being an improvement of 46% with respect to the original method and 65% with respect to Kim's method.

| ANNEX 1 |
| --- |
| Input: Sentence S: concatenation of word that may or may not have punctuation signs, capital letters, etc. |
| Output: Sentence T: concatenation of words without punctuation |
| S1= Substitute_urls(S,'_URLS_') |
| S2= Substitute_percentage(S1,'_PERC_') |

ANNEX 1

```
V=Split_words(S2)
foreach v in V do
    if v not punctuation then
        add_to_list(T, lowercase(v))
    end
end
```

The invention claimed is:

1. A method of processing an electronic document comprising text, the method comprising:
    splitting the text into at least one sentence; and
    for each sentence:
        associating each word of the sentence with a word-vector;
        representing the sentence by a sentence-vector, wherein said representing comprises computing a weighted average of word-vectors associated with the sentence to obtain the sentence-vector;
        if the sentence-vector is associated with a tag in a data set of sentence-vectors associated with tags, obtaining the tag from the data set;
        if the sentence-vector is not associated with a tag in the data set, obtaining a tag for the sentence-vector using a classification algorithm; and
        processing the sentence if the tag obtained for the sentence is associated with a predetermined label,
    the method further comprising assigning a weight to the word-vector, the weight assigned to the word-vector being inversely proportional to the probability of finding the word associated to the word-vector in the text.

2. The method of claim 1, wherein associating a word of the sentence with a word-vector comprises:
    obtaining the word-vector associated with the word from a database, if the word is already associated with a word-vector in the database; or
    generating the word-vector with random values if the word is not already associated with a word-vector in the database.

3. The method of claim 1, wherein the weight ($w_i$) given to a word-vector ($u_i$) is provided by:

$$w_i = a/(a+p(u_i))$$

where a is a number, and $p(u_i)$ is the probability of finding the word (i) associated to said word-vector in the text.

4. The method of claim 1, wherein associating a word of the sentence with a word-vector comprises:
    using a weighted least squares model that trains on global word-word co-occurrence counts; or
    using a two layer neural network trained on predicting the word given the context.

5. The method of claim 1, wherein determining whether the sentence-vector is associated with a tag in the data set comprises searching the sentence-vectors in the data set, wherein said searching implements:
    an exhaustive search;
    a multidimensional binary search tree that organizes the space of sentence-vectors by implicitly splitting the space using half-hyperplanes; or
    a branch and bound algorithm for finding k-nearest neighbours.

6. The method of claim 1, further comprising:
    replacing capital letters by lower case letters in each sentence; and
    deleting predetermined characters in each sentence.

7. The method of claim 1, comprising normalizing the sentence-vector.

8. The method of claim 7, wherein said normalizing comprises projecting the sentence-vector on a precomputed sentence-vector and subtracting the result of said projection from said sentence-vector.

9. The method of claim 8, wherein the precomputed sentence-vector is computed as the first component of a Principal Component Analysis.

10. The method of claim 1, wherein, if the sentence-vector is not associated with a tag in the data set, obtaining the tag for the sentence-vector using a classification algorithm comprises:
    obtaining a matrix where each column with index 'i' contains the word-vector associated with the i-th word in said sentence;
    determining a tag for said sentence using said matrix and a pre-trained classification method; and
    storing said tag in association with said sentence-vector (s) in said data set.

11. The method of claim 10, wherein the pre-trained classification method is chosen among:
    a sentence classification method comprising representing the sentence as a concatenation of word embeddings, wherein each word is represented as a column in the matrix; and inputting the matrix into a Convolutional Neural Network classifier; or
    a supervised classification method.

12. The method of claim 1, comprising:
    presenting to a user the sentence and the tag obtained for the sentence-vector representing the sentence; and
    enabling the user to correct the tag associated with the sentence-vector in the data set.

13. A device for processing an electronic document, comprising:
    a processor; and
    a memory storing instructions that, when executed by the processor, cause the process to perform a method comprising:
    splitting the text into at least one sentence; and
    for each sentence:
        associating each word of the sentence with a word-vector;
        representing the sentence by a sentence-vector, wherein said representing comprises computing a weighted average of word-vectors associated with the sentence to obtain the sentence-vector;
        if the sentence-vector is associated with a tag in a data set of sentence-vectors associated with tags, obtaining the tag from the data set;
        if the sentence-vector is not associated with a tag in the data set, obtaining a tag for the sentence-vector using a classification algorithm; and
        processing the sentence if the tag obtained for the sentence is associated with a predetermined label,
    the method further comprising assigning a weight to the word-vector, the weight assigned to the word-vector being inversely proportional to the probability of finding the word associated to the word-vector in the text.

14. The device of claim 13, wherein associating a word of the sentence with a word-vector comprises:
    obtaining the word-vector associated with the word from a database, if the word is already associated with a word-vector in the database; or
    generating the word-vector with random values if the word is not already associated with a word-vector in the database.

15. The device of claim 13, wherein associating a word of the sentence with a word-vector comprises:
- using a weighted least squares model that trains on global word-word co-occurrence counts; or
- using a two layer neural network trained on predicting the word given the context.

16. The device of claim 13, wherein the method further comprises:
- replacing capital letters by lower case letters in each sentence; and
- deleting predetermined characters in each sentence.

17. The device of claim 13, wherein, if the sentence-vector is not associated with a tag in the data set, obtaining the tag for the sentence-vector using a classification algorithm comprises:
- obtaining a matrix where each column with index 'i' contains the word-vector associated with the i-th word in said sentence;
- determining a tag for said sentence using said matrix and a pre-trained classification method; and
- storing said tag in association with said sentence-vector (s) in said data set.

18. The device of claim 13, wherein the method further comprises:
- presenting to a user the sentence and the tag obtained for the sentence-vector representing the sentence; and
- enabling the user to correct the tag associated with thr sentence-vector in the data set.

19. A method of processing an electronic document comprising text, the method comprising:
- splitting the text into at least one sentence; and
- for each sentence:
  - associating each word of the sentence with a word-vector;
  - representing the sentence by a sentence-vector, wherein said representing comprises computing a weighted average of word-vectors associated with the sentence to obtain the sentence-vector;
  - if the sentence-vector is associated with a tag in a data set of sentence-vectors associated with tags, obtaining the tag from the data set;
  - if the sentence-vector is not associated with a tag in the data set, obtaining a tag for the sentence-vector using a classification algorithm; and
  - processing the sentence if the tag obtained for the sentence is associated with a predetermined label,
- the method comprising normalizing the sentence-vector, wherein said normalizing comprises projecting the sentence-vector on a precomputed sentence-vector and subtracting the result of said projection from said sentence-vector.

* * * * *